United States Patent [19]
Thompson

[11] 3,824,065
[45] July 16, 1974

[54] METHOD OF DRYING A PRODUCT

[76] Inventor: Stanley P. Thompson, 2718 Osborn Rd., Topeka, Kans. 66614

[22] Filed: Apr. 30, 1973

[21] Appl. No.: 355,713

Related U.S. Application Data

[63] Continuation-in-part of Ser. No. 135,068, April 19, 1971, Pat. No. 3,749,382.

[52] U.S. Cl. .................. 432/14, 432/58, 432/105
[51] Int. Cl. ........................ F27b 7/02, F27b 15/00
[58] Field of Search ............ 432/14, 58, 72, 86, 105

[56] References Cited
UNITED STATES PATENTS
2,952,452  9/1960  Kopf ..................................... 432/72
3,603,568  9/1971  Ritzmann ............................. 432/58

Primary Examiner—John J. Camby
Attorney, Agent, or Firm—Lowe, Kokjer, Kircher, Wharton & Bowman

[57] ABSTRACT

A method of drying a product utilizing a combustible fuel employs combustion gases as the medium for conveying the product through the dryer. The combustible fuel is burned in a combustion zone to produce heat and gases of combustion. The heat and gases are moved from one end of a drying zone to the opposite end along with the product being dried, which is pneumatically conveyed. A portion of the combustion gases are then separated from the dried product and directed along a path, which bypasses the combustion zone, to reintroduce the gases into the forward end of the drying zone. By recycling the combustion gases for use as the conveying medium, while bypassing the combustion zone, the oxygen content is reduced in the drying zone without affecting combustion in the combustion zone. Thus there is less likelihood of thermal decomposition occurring in the drying zone. The recycling of the combustion gases which have a relatively high vapor content also increases the vapor pressure of the liquid water droplets in the drying zone. These droplets may therefore remain near the surface of the product being dried for a longer period of time and act as a barrier against thermal decomposition. The relatively high K value of the water droplets also facilitates heat transfer to the interior of the product thereby forcing additional moisture toward the surface.

4 Claims, 6 Drawing Figures

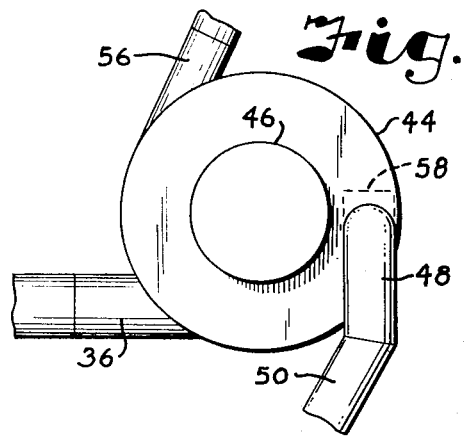
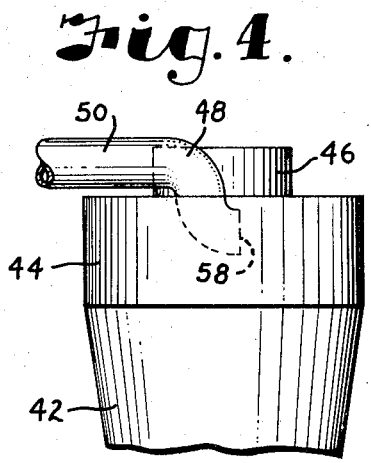
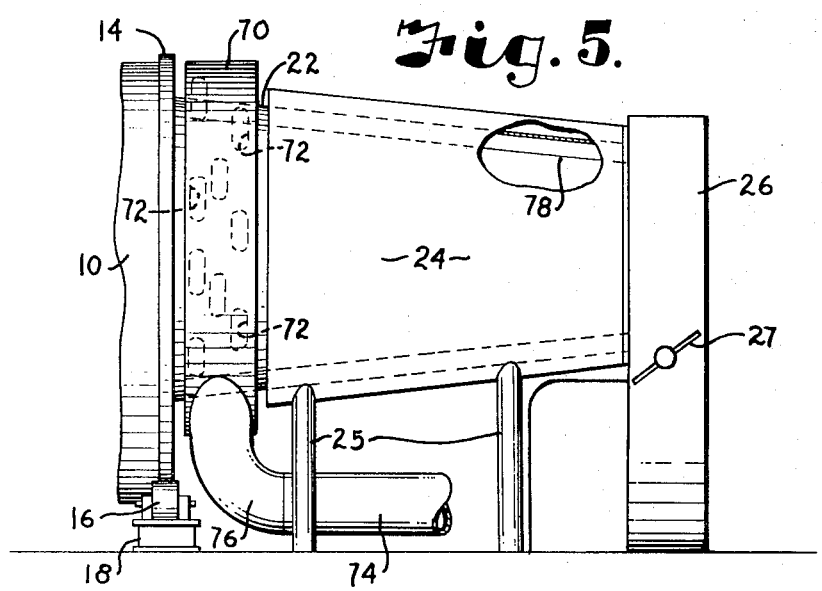
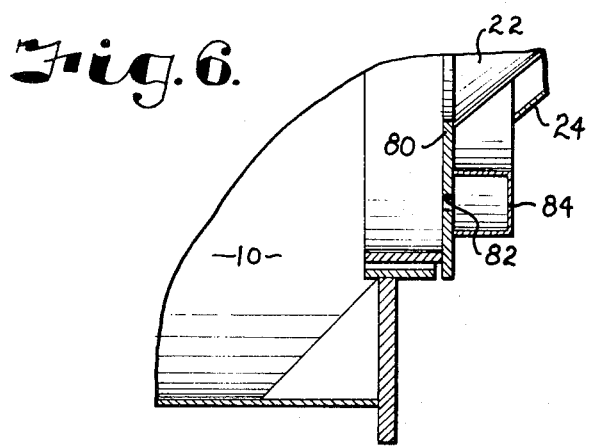

METHOD OF DRYING A PRODUCT

This is a continuation-in-part of application Ser. No. 135,068, filed Apr. 19, 1971 and now U.S. Pat. No. 3,749,382.

This invention relates to improvements in dehydrating methods.

It has long been the practice in the processing of agricultural crops such as alfalfa to remove excess water from the alfalfa prior to processing of the same. This requires that the alfalfa be passed through a large dehydrating drum wherein the temperature is raised to a relatively high level to drive off the water after which the alfalfa is normally comminuted and then pelletized. When the alfalfa is heated in the drying drum the foreign particles which are present in the crop and have a considerably lower moisture content undergo thermal decomposition. Also those particles of the alfalfa which are very thin and dry tend to undergo thermal decomposition for the same reasons. This thermal decomposition of particles is the major source of air pollution emanating from dehydrating apparatus since the decomposition produces particles which pass out of the dehydrator and into the atmosphere. This thermal decomposition is also the source of the unpleasant odor which has long been associated with alfalfa dehydrating equipment.

It is therefore the primary object of the present invention to provide a method for dehydrating a product wherein thin, dry particles present in the product to be dried do not undergo thermal decomposition and the air pollution attributable to the apparatus is thereby effectively reduced.

As a corollary to the above object, an aim of this invention is to prevent the thermal decomposition of particles in dehydrating equipment by maintaining the oxygen content of the dehydrator at a sufficiently low level so as to preclude thermal decomposition.

Still another object of this invention is to preclude thermal decomposition of particles in a dehydrator by maintaining the oxygen content at a relatively low level through the use of combustion gases from the dehydrator heat source as the medium for conveying the product to be dried through the dehydrator.

As a corollary to the above object, an aim of this invention is to provide for a low oxygen content in the drying zone without lowering the oxygen content in the combustion zone thereby maintaining high temperatures as a result of efficient combustion in the combustion zone.

As another corollary to the object second above, an objective of this invention is to maintain the oxygen level within the drying zone below 10 per cent at all times.

It is also one of the objects of this invention to provide a method for dehydrating a product wherein the quantity of the product being pneumatically conveyed through the drying zone can be increased without increasing the oxygen content within the drying zone.

Still another aim of this invention is to provide a method and apparatus for dehydrating a product which will permit the dehydrating zone to be maintained at higher temperature levels than has heretofore been possible without the thermal decomposition of foreign particles or the product being dried.

Still another objective of the invention is to provide a method of increasing the vapor pressure within the drying zone thereby accommodating higher temperatures before vaporization occurs resulting in more effective drying and less charring and burning.

In the drawings:

FIG. 3 is a top plan view of the cyclone separator shown in FIG. 1 and illustrating the manner in which the various gas conduits and product lines enter the top of the separator;

FIG. 4 is a partial side elevational view of the cyclone separator illustrating the manner in which the combustion gas conduit is disposed adjacent the separator stack;

FIG. 5 is a partial side elevational view of the inlet end of the dehydrator drum and the furnace associated therewith, showing an alternative arrangement for recycling the combustion gases through the drying drum; and FIG. 6 is an enlarged partial cross-sectional view of the inlet end of the dehydrator drum illustrating still another alternative arrangement for recycling the combustion gases through the drum.

Figure 1:
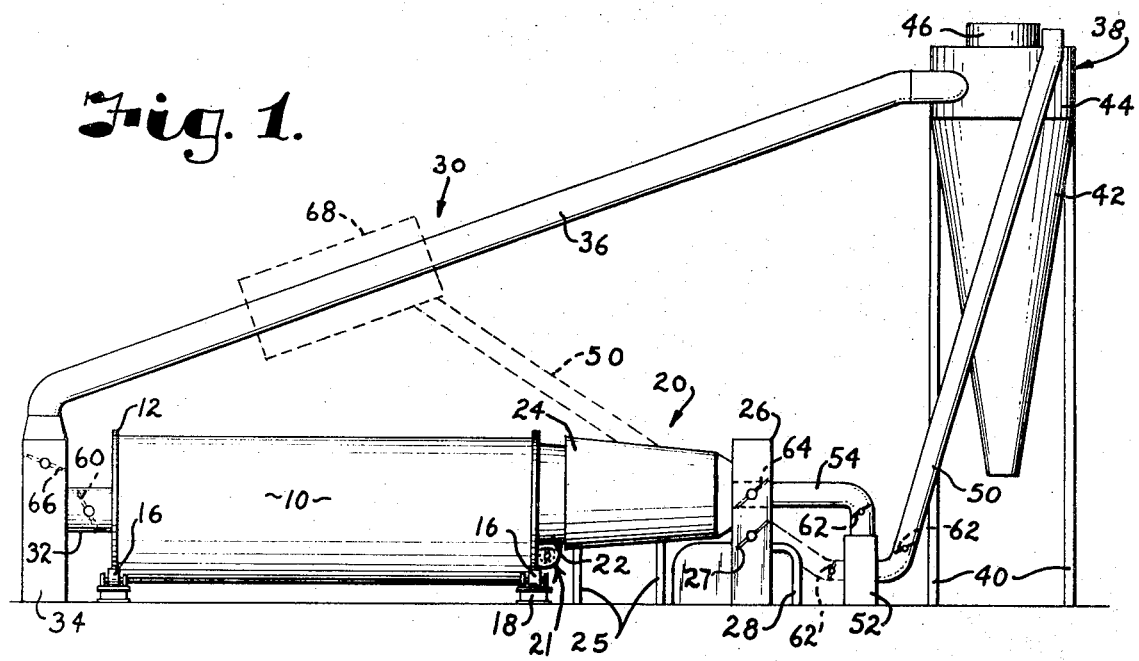
FIG. 1 is a side elevational view of the dehydrator constructed according to the present invention and coupled with a cyclone separator.

Referring initially to the preferred embodiment of the invention which is illustrated in FIGS. 1, 3 and 4, a horizontally disposed, cylindrical drying drum 10 is provided with a pair of external end flanges 12 and 14 which mount the drum for rotation upon a plurality of rollers 16. The rollers 16 are in turn supported by mounting pads 18. An appropriate drive mechanism (not shown) is coupled with the drum 10 for rotating the latter during the dehydrating process. The drum 10 defines an elongated drying zone and has a material inlet designated generally by the numeral 21. The drying zone is in communication with a heat source designated generally by the numeral 20 disposed adjacent to and on the same side of the dryer as the material inlet.

The heat source 20 which is disposed immediately ahead of the material inlet includes a frustoconical configured furnace 22 which is surrounded by a circumferentially spaced shroud 24, and a blower fan which is designated by the numeral 26 disposed on the same side of drum 10 as the material inlet to the latter. Air flow through fan 26 is controlled by a damper 27. The furnace 22 and the shroud 24 are supported by a pair of vertical legs 25 which are rigid with the shroud. The furnace 22 utilizes a source of combustible fuel such as natural gas which is supplied by a conduit 28. Furnace 22 is preferably of the same type as shown and described in U.S. Pat. No. 3,593,430 issued to the present applicant on July 20, 1971. This patent is incorporated herein by reference to the extent necessary to obtain a full and complete understanding of the present invention.

As shown in FIG. 5 of the drawings, the furnace 22 has a refractory lining 78 which defines a highly efficient combustion zone. As partially explained in the referenced patent, the combustion zone for this type of furnace is limited to the area immediately adjacent lining 78 and combustion does not take place along the central longitudinally extending axial area of furnace 22.

The end of the drum 10 which is opposite the inlet end is provided with a material outlet through which the dried product passes. Structure for communicating the outlet end of the drum 10 with the inlet end of the drum end and for directing the dried product to subsequent processing stages is designated generally by the numeral 30 in FIG. 1 and includes an annular duct 32 contiguous with the outlet end of the drum 10, an exhaust fan designated by the numeral 34, and a dehydrated product delivery line 36. A cyclone separator 38 which serves as a primary collector for removing the dried product from the conveying medium is supported by a pair of upright standards 40 and includes a frustoconical portion 42 and an integral upright cylindrical portion 44 which is integral with the portion 42 at the base of the latter. A cylindrical stack 46 extends through the top of the portion 44 and down into the interior of the separator 38 to provide an exhaust outlet for the water which is driven off during the dehydrating process and converted into steam.

As best illustrated in FIG. 3, the delivery line 36 communicates with the separator 38 in tangential relationship to the portion 44 so as to assure that a "whirling motion" will be imparted to the dried product as it enters the separator. Referring additionally to FIG. 4, it is seen that an elbow provides an inlet section for a conduit 50 which extends downwardly from the top of the separator 38. The conduit 50 communicates with an auxiliary fan designated by the numeral 52, the latter being in communication with the material inlet to the drum through a duct 54 which extends through fan 26 and communicates with the central axis area of furnace 22.

Referring particularly to FIG. 3, a return conduit 56 communicates with the separator 38 and is also tangentially disposed relative to the portion 44. It is to be noted that the line 36 and the conduits 50 and 56 each communicate with the separator 38 at different circumferentially spaced points around the portion 44. The inlet 58 to the section 48 is slightly closer to the conduit 56 than it is to the conduit 36 for purposes to be made clear hereinafter. The elbow 48 extends down into the separator 38 as best illustrated in FIG. 4 and the inlet 58 is disposed facing away from the direction of travel of the dried product being introduced into the separator through the line 36.

Referring again to FIG. 1, first air flow control means in the form of a damper 60 is disposed in the duct 32 immediately ahead of the exhaust fan 34, and a second air flow control in the form of a damper 62 is disposed in the conduit 50 immediately ahead of the fan 52. Additional air flow control means include a damper 62 in the duct 54 ahead of the blower fan 26, a damper 64 in the housing of the fan 26, and a damper 66 in the housing of the fan 34.

In carrying out the method of the present invention natural gas or some other combustible fuel is burned in the combustion zone of furnace 22 to produce heat and combustion gases. The combustion is supported by air which is drawn into the furnace between the outside of the latter and the inside of shroud 24 by the action of blower fan 26. The heat and combustion gases from furnace 22 are moved through the drying zone defined by drum 10 through the cooperative action of fan 26 and fan 34 which pulls in the direction of the outlet end of the drum 10.

The product to be dried, as for example alfalfa, is introduced into the drum 10 by appropriate delivery structure associated with inlet 21. As described in U.S. Pat. No. 3,593,429, issued July 20, 1971, which patent is incorporated herein by reference, it is desirable to apply a controlled amount of water to the outer surface of a product being dried prior to introducing the product into drum 10. The product is pneumatically conveyed from the end of the drying zone nearest the combustion zone to the opposite end by the action of fans 26 and 34. Manifestly, the next step is to move the dried product along the path defined by duct 36 to separator 38 where at least a portion of the gases of combustion from the drying drum are separated from the dried product.

Within separator 38 the dried product is removed from the conveying medium as the product gravitates to the bottom of the separator and the water removed during the dehydration process, which has largely been converted to steam within drum 10, is discharged through stack 46. The product is then removed from the bottom of separator 38 for delivery to subsequent processing operations. In the case of alfalfa, this would normally include a comminuter and pelleting mill.

As best understood with reference to FIG. 3 since the inlet 58 of conduit 50 is circumferentially spaced and faces away from the delivery line 36, there is little tendency for the dried alfalfa entering the separator to be pulled into the conduit 50. On the other hand, the much lighter combustion gases which are conveyed to the separator 38 through the line 36 are drawn into the conduit 50 by the action of the auxiliary fan 52. The return conduit 56 returns residual alfalfa particles from the subsequent comminuting and pelleting operations to the separator 38 and the conveying medium within the conduit 56 is relatively rich in oxygen content However, the conduit 56 is circumferentially spaced from the inlet 58 and directs its discharge away from the inlet. For this reason, it is preferable to locate the inlet 58 slightly closer to the conduit 56 than it is to the delivery line 36. This results in a sufficiently great stratification of the relatively rich oxygen medium from the conduit 56 and the relatively oxygen free medium from the line 36 so as to not significantly increase the oxygen content within the conduit 50. Thus, the separated portion of combustion gases is directed along the path defined by conduit 50 back toward the inlet end of the drying zone.

As a result of duct 54 passing through the center of fan housing 26 the recycled combustion gases are introduced into the central axially extending area of furnace 22. The recycled gases thereby bypass the combustion zone of furnace 22 and do not interfere with burning of the combustible fuel. Finally, these recycled gases are introduced into the inlet end of the drying zone where they continue to comprise a major portion of the pneumatic conveying medium.

The fan 34 must be operated at a sufficiently high rate of speed to maintain the necessary flow of air through the drum 10 to pneumatically convey the alfalfa or other product being dried. Heretofore, the conveying medium for the product being dried has been air entering the furnace 22 through the shroud 24 or through other openings extending to the atmosphere. Because this fresh air is relatively rich in oxygen and has a relatively low vapor pressure, thermal decomposition readily occurs within the drum 10 at the normal drying temperatures in the range of 300°F, and a large portion of the foreign particles which are inevitably present within the alfalfa as well as relatively thin, dry particles of the alfalfa itself have been burned at these temperatures present within the drum. A certain minimal quantity of oxygen is, of course, needed to support combustion with the furnace 22 although it has been found that the quantity of fresh air required to meet these minimal requirements is far below the quantity required to comprise the conveying medium. In the present invention, the combustion gases which are produced by the burning of the natural gas in the furnace 22 are recycled through the drum 10 via the structure 30 to comprise a major portion of the medium for conveying alfalfa through the drum.

By recycling the combustion gases to the drying zone the oxygen content within this zone can be maintained below approximately 10 per cent which is not a sufficiently high oxygen content to support combustion of particles within the zone. On the other hand, since the recycled gases bypass the combustion zone they do not lower the relative oxygen content in the combustion zone and therefore do not interfere with burning of the combustible fuel.

A definite advantage of the method of the present invention is that higher temperatures may be accommodated within the drying zone without danger of thermal decomposition of the product being dried. This naturally enhances the drying efficiency as well as the capacity of the dehydrating apparatus. It has also been found that recycling of the combustion gases to the drying zone while bypassing the combustion zone provides a conveying medium which is relatively high in water content thus raising the vapor pressure of the entire atmosphere within drum 10. Because of the increased vapor pressure higher temperatures are required before vaporization is achieved. Thus, water introduced onto the drum will remain for a longer period of time thereby increasing the protection afforded against thermal decomposition as a result of application of this controlled amount of water. Also, water driven from within the product being dried to a location near its surface will remain near the surface for a longer period of time augmenting the protection afforded by the water applied externally before the product is introduced into the drying drum.

It is also thought that because of the presence of additional water near the surface of the product being dried, which water has a relatively high K value heat is more efficiently transferred to the interior of the product where water which is the most difficult to remove is entrapped. Thus, the additional water present which is directly attributable to the increased vapor pressure of the drying atmosphere as a result of recycling of the combustion gases, provides for a highly efficient heat transfer medium further enhancing the effectiveness of the drying operation.

To control the flow of the conveying medium and hence the quantity of product dried through the drum 10 the control damper 60 is opened or closed as may be desired. Opening of the damper 60 also increases the flow of combustion gases being recycled through the line 36 and the conduit 50 and for this reason additional dampers 62 are provided in the conduit 50 and the duct 54 for varying the flow of gases therethrough in proportion to the requirements of the system. Dampers 64, 66 and 27 may also be adjusted in a manner readily apparent to those skilled in the art to meet the requirements of various operating conditions. Manifestly, the more water vapor removed in the drying zone as a result of the quantity of product being dried, the smaller the quantity of combustion bases which need to be recycled to maintain the desired high vapor pressure.

An alternative arrangement for the conduit 50 is illustrated in phantom in FIG. 1. In this instance, a manifold 68 is provided in surrounding relationship to the line 36 and the conduit 50 communicates with the manifold 68. The end of the conduit 50 opposite the manifold 68 would again communicate with the inlet of the drying zone through auxiliary fan 52, duct 54, and furnace 22. An additional control damper 62 is placed immediately adjacent the fan 52. With this alternative arrangement, an appropriate sized screen (not shown) is included within the manifold 68 to prevent the dried product from being pulled into the conduit 50. The combustion gases which comprise the conveying medium pass through the conduit 50 while the dried product passes to the separator 38 through line 36. Operation of the dehydrating apparatus is the same as for the embodiment previously described although the extent of separation of the gases from the dried product is not as great as with the previously described arrangement. The steps of the method of the invention are the same as previously described.

Figure 2:
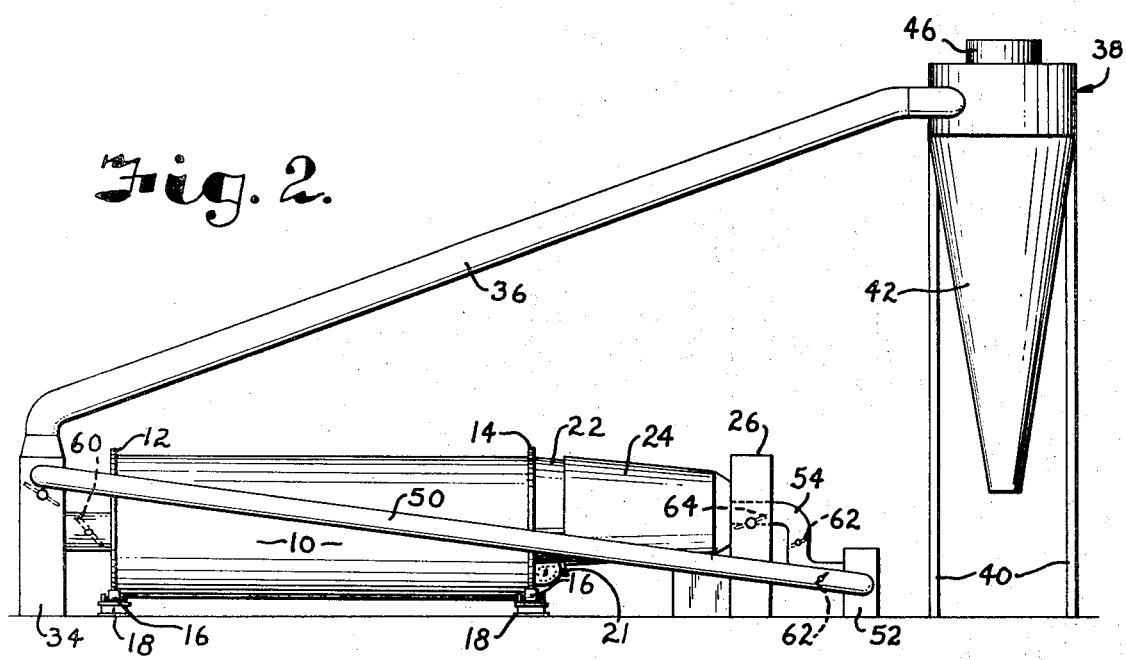
FIG. 2 is a side elevational view similar to FIG. 1 and showing an alternative arrangement of the structure for recirculating the combustion gases through the drying drum.

Another alternative arrangement for the dehydrating apparatus utilized in carrying out the method is illustrated in FIG. 2 wherein the conduit 50 communicates directly with one side of the exhaust fan 34 to recycle combustion gases to the opposite end of the drum 10. One end of the conduit 50 communicates with the housing of the fan 34 while the other end communicates with the auxiliary fan 52 in the same manner as described above for the alternative locations of the conduit 50. Operation of the apparatus shown in FIG. 2 is identical to that previously described for the embodiment of FIGS. 1, 3 and 4, and the steps of the method are the same as previously described.

In FIG. 5 still another alternative form of the invention is illustrated. Disposed on the same side of the dryer as the material inlet is a combustion gas recycle inlet manifold 70 which encircles the furnace 22 and communicates with the latter through a plurality of openings 72. An extension 74 of the conduit 50 communicates with the manifold 70 through an elbow 76. It will be appreciated that the conduit 50 can be disposed in any of the three locations described above although it is preferable to run the conduit 50 from the top of the separator 38 as shown in FIG. 1. As shown in the broken away portion of FIG. 5, the furnace 22 has a refractory lining 78 for facilitating heat transfer to the drum 10. Operation of the apparatus shown in FIG. 5 is identical to that of the preferred embodiment described above although the combustion gases which comprise the conveying medium are recycled through the inlet manifold 70 rather than through the blower fan 26. This is still another way of bypassing the combustion zone to assure that the oxygen content therein will not be reduced. The method steps employed in carrying out the invention remain the same.

In still another alternative form of the invention which is illustrated in FIG. 6 of the drawings, an annular plate 80 is secured to the end of the furnace 22 which is adjacent the inlet to the drum 10. The plate 80 has a plurality of openings 82 therein which communicate with a combustion gas recycle inlet 84. Manifestly, combustion gas inlet manifold 84 is disposed on the same side of the dryer as the material inlet to the latter. The conduit 50 can be communicated with the manifold 84 in any appropriate manner such as by an extension 74 and an elbow 76 as described for the embodiment of FIG. 5. Operation of the embodiment of FIG. 6 is identical to the operation previously described for the embodiment of FIGS. 1, 3 and 4 although the combustion gases are recycled through the drum 10 via the manifold 84 rather than through the blower fan 26. Again, however, the combustion zone is bypassed by the recycle gases.

Having thus described the invention, I claim:

1. A method of drying a product comprising the steps of:
   burning a combustible fuel in a combustion zone to produce heat and gases of combustion;
   moving the heat and gases of combustion through a longitudinally extending drying zone disposed on one side of the combustion zone;
   pneumatically conveying the product from one end of the drying zone which is nearest the combustion zone to the opposite end of the drying zone without passing the product through the combustion zone;
   separating at least a portion of the gases of combustion from the product after the latter passes from the drying zone;
   directing the separated portion of the combustion gases along a path independent of the drying zone and toward said one end of the drying zone;
   bypassing the combustion zone with said separated portion of gases; and
   introducing said separated portion of gases into the drying zone at said one end whereby said separated portion of gases comprises a portion of the pneumatic conveying medium.

2. A method as set forth in claim 1, wherein is included the step of varying the flow of gases directed along said path in accordance with the quantity of said product being conveyed through the drying zone.

3. A method as set forth in claim 1, wherein is included the step of spraying water onto said product prior to conveying the product through the drying zone.

4. A method as set forth in claim 1, wherein is included subsequent to said separating step the step of advancing any remaining portion of the gases together with the dried product to a separating zone for complete separation of the product from the conveying medium.

* * * * *